(12) United States Patent
Thomen et al.

(10) Patent No.: US 10,626,729 B2
(45) Date of Patent: Apr. 21, 2020

(54) OBTUSE ANGLE CHEVRON TRIP STRIP

(71) Applicant: United Technologies Corporation, Hartford, CT (US)

(72) Inventors: Seth J. Thomen, Colchester, CT (US); Edward F. Pietraszkiewicz, Southington, CT (US); Dominic J. Mongillo, Jr., West Hartford, CT (US); Wieslaw A. Chlus, Wethersfield, CT (US); Erik R. Granstrand, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 1008 days.

(21) Appl. No.: 14/774,157

(22) PCT Filed: Mar. 13, 2014

(86) PCT No.: PCT/US2014/025177
§ 371 (c)(1),
(2) Date: Sep. 10, 2015

(87) PCT Pub. No.: WO2014/159800
PCT Pub. Date: Oct. 2, 2014

(65) Prior Publication Data
US 2016/0032730 A1    Feb. 4, 2016

Related U.S. Application Data

(60) Provisional application No. 61/781,630, filed on Mar. 14, 2013.

(51) Int. Cl.
*F01D 5/18* (2006.01)
*F01D 9/04* (2006.01)
(Continued)

(52) U.S. Cl.
CPC ............ *F01D 5/186* (2013.01); *F01D 5/187* (2013.01); *F01D 9/041* (2013.01); *F01D 11/08* (2013.01);
(Continued)

(58) Field of Classification Search
CPC .......... F01D 11/08; F01D 25/12; F01D 5/186; F01D 5/187; F01D 9/041; F05D 2220/32;
(Continued)

(56) References Cited

U.S. PATENT DOCUMENTS 5,052,889 A     10/1991   Abdel-Messeh
6,290,462 B1 *   9/2001   Ishiguro ................. F01D 5/187
                                                     416/97 R
(Continued)

FOREIGN PATENT DOCUMENTS

EP          0735240 A1    10/1996

OTHER PUBLICATIONS

International Preliminary Report on Patentability for International Application No. PCT/US2014/025177 dated Sep. 24, 2015.
(Continued)

*Primary Examiner* — Patrick Hamo
*Assistant Examiner* — Paul W Thiede
(74) *Attorney, Agent, or Firm* — Carlson, Gaskey & Olds, P.C.

(57) ABSTRACT

An airfoil includes a cooling air passage for receiving a cooling air flow. A chevron including a first rib and a second rib extends from a common tip is disposed within the cooling passage for generating a turbulent flow to improve heat transfer. The chevron includes an angle between the first rib and the second rib that is greater than 90 degrees.

12 Claims, 5 Drawing Sheets

(51) Int. Cl.
*F01D 25/12* (2006.01)
*F01D 11/08* (2006.01)

(52) U.S. Cl.
CPC .......... *F01D 25/12* (2013.01); *F05D 2220/32* (2013.01); *F05D 2220/36* (2013.01); *F05D 2230/10* (2013.01); *F05D 2240/12* (2013.01); *F05D 2240/30* (2013.01); *F05D 2240/55* (2013.01); *F05D 2260/202* (2013.01); *F05D 2260/22141* (2013.01); *Y02T 50/676* (2013.01)

(58) Field of Classification Search
CPC ............. F05D 2220/36; F05D 2230/10; F05D 2240/12; F05D 2240/30; F05D 2240/55; F05D 2260/202; F05D 2260/22141; Y02T 50/676
USPC ................................ 416/96 R, 97 R; 415/115
See application file for complete search history.

(56) References Cited

U.S. PATENT DOCUMENTS

| | | |
|---|---|---|
| 7,513,745 B2 | 4/2009 | Abdel-Messeh et al. |
| 7,866,947 B2 | 1/2011 | Pietraszkiewicz et al. |
| 8,192,146 B2 | 6/2012 | Liang |
| 8,210,812 B2 | 7/2012 | Abdel-Messeh et al. |
| 2003/0049125 A1 | 3/2003 | Bolms et al. |
| 2006/0051208 A1 | 3/2006 | Lee et al. |
| 2007/0297916 A1 | 12/2007 | Levine et al. |
| 2011/0286857 A1 | 11/2011 | Gleiner et al. |
| 2012/0328450 A1 | 12/2012 | Spangler et al. |

OTHER PUBLICATIONS

International Search Report and Written Opinion for International Application No. PCT/US2014/025177 dated Jul. 2, 2014.

* cited by examiner

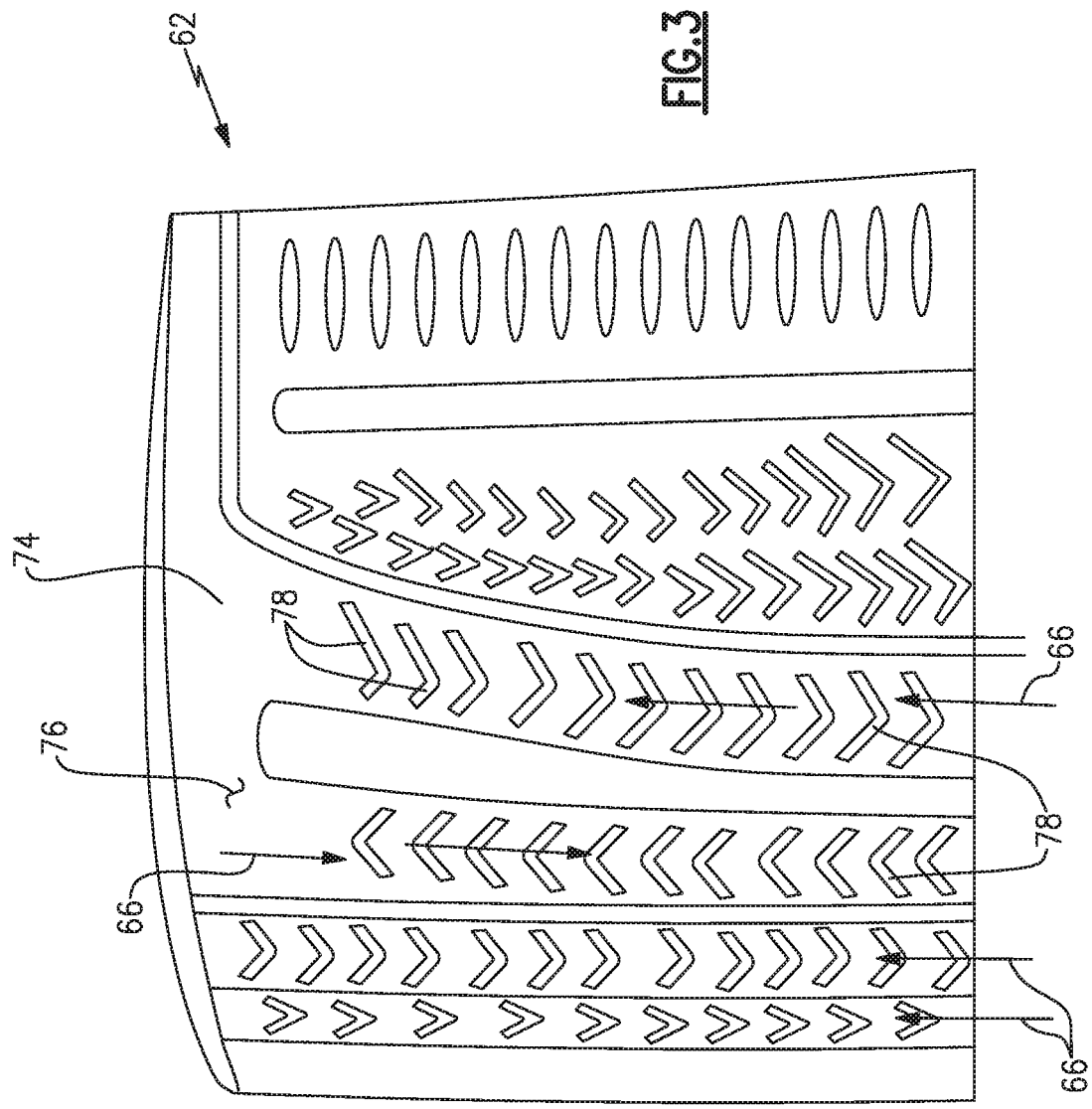

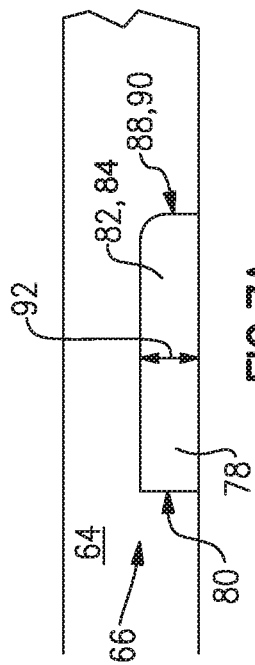
FIG.7A
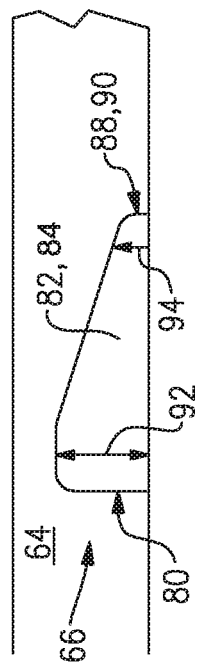
FIG.7B
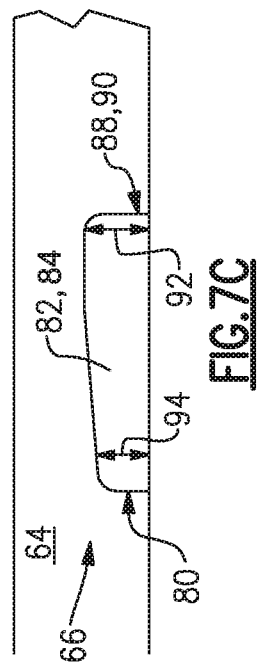
FIG.7C
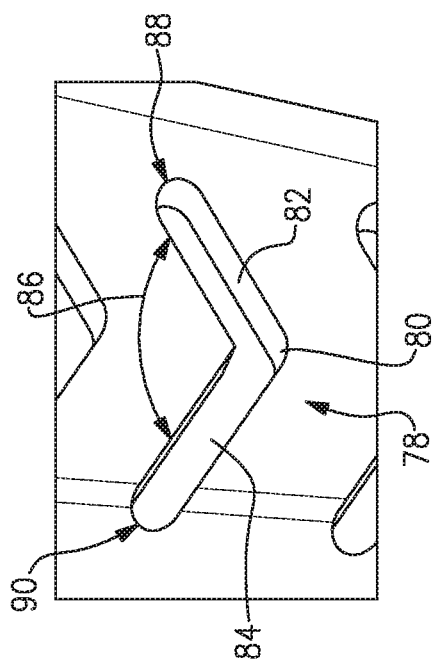
FIG.4
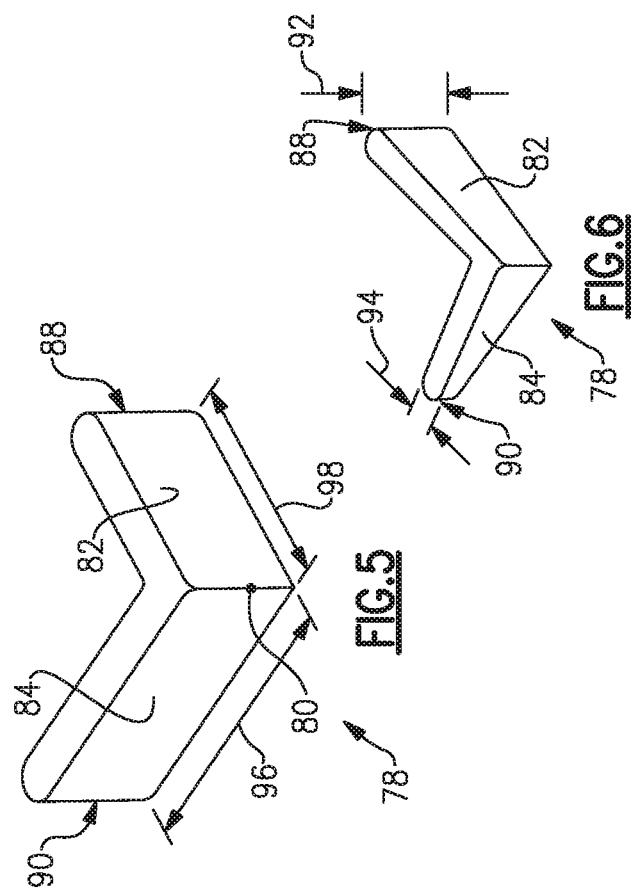
FIG.5
FIG.6

OBTUSE ANGLE CHEVRON TRIP STRIP

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Structures such as turbine blades within the high-speed exhaust gas flow encounter extreme temperatures and therefore are often provided with cooling features. Cooling features include internal passages through which cooling air flow. The flow of cooling air is modified to increase heat transfer properties with structures within the cooling channels. The structures generate turbulent flow in the cooling air that improves heat transfer.

Although structures for improving heat transfer are currently utilized, there remains need to improve heat transfer to enable operation at increasing temperatures that provide increased engine operation efficiencies.

SUMMARY

An airfoil according to an exemplary embodiment of this disclosure, among other possible things includes a cooling air passage receiving a cooling air flow, and a chevron including a first rib and a second rib extending from a common tip. An angle between the first rib and the second rib is greater than ninety (90) degrees.

In a further embodiment of the foregoing airfoil, the angle between the first rib and the second rib is less than one-hundred-eighty (180) degrees.

In a further embodiment of any of the foregoing airfoils, the angle between the first rib and the second rib is between about ninety-five (95) degrees and one-hundred-seventy-five (175) degrees.

In a further embodiment of any of the foregoing airfoils, the first rib and second rib include a uniform height above a surface of the cooling channel.

In a further embodiment of any of the foregoing airfoils, the first rib and the second rib include an increasing height from the tip towards a first end of the first rib and a second end of the second rib.

In a further embodiment of any of the foregoing airfoils, the first rib includes a first end and the second rib includes a second end and a height of the chevron increases from the first end toward the second end.

In a further embodiment of any of the foregoing airfoils, the first rib includes a first end and the second rib includes a second end and a height of the chevron decrease from the first end toward the second end.

In a further embodiment of any of the foregoing airfoils, the first rib and the second rib are of a common length.

In a further embodiment of any of the foregoing airfoils, the first rib and the second rib are of unequal lengths.

In a further embodiment of any of the foregoing airfoils, the tip is pointed into cooling air flow.

In a further embodiment of any of the foregoing airfoils, each of the cooling air passages includes side walls and the tip of the chevron is spaced apart from a midpoint between the side walls.

A turbine engine component according to an exemplary embodiment of this disclosure, among other possible things includes a cooling channel receiving a cooling air flow, and a chevron including a first rib and a second rib extending from a common tip, wherein an angle between the first rib and the second rib is greater than ninety (90) degrees.

In a further embodiment of the foregoing turbine engine component, the angle between the first rib and the second rib is less than one-hundred-eighty (180) degrees.

In a further embodiment of any of the foregoing turbine engine components, the angle between the first rib and the second rib is between about ninety-five (95) degrees and one-hundred-seventy-five (175) degrees.

In a further embodiment of any of the foregoing turbine engine components, the first rib and second rib include a uniform height above a surface of the cooling channel.

In a further embodiment of any of the foregoing turbine engine components, the first rib and the second rib varying in height above a surface of the cooling channel.

A method of forming a cooling passage according to an exemplary embodiment of this disclosure, among other possible things includes forming a cooling passage to direct cooling air, and forming a chevron on a surface of the cooling passage including a first rib and a second rib extending from a common tip with an angle between the first rib and the second rib is greater than 90 degrees.

In a further embodiment of the foregoing method, includes forming the angle between the first rib and the second rib to be less than one-hundred-eighty (180) degrees.

In a further embodiment of any of the foregoing methods, includes forming the angle between the first rib and the second rib to be between about ninety-five (95) degrees and about one-hundred-seventy-five (175) degrees.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a perspective view of cooling air passaged within an airfoil.

FIG. 4 is an enlarged view of an example chevron within a cooling air passage.

FIG. 5 is a perspective view of example chevron configuration.

FIG. 6 is a perspective view of another example chevron configuration.

FIG. 7a is a schematic view of a chevron within a cooling air passage.

FIG. 7b is a schematic view of another example chevron within a cooling air passage.

FIG. 7c is a schematic view of yet another example chevron within a cooling air passage.

DETAILED DESCRIPTION

Figure 1:
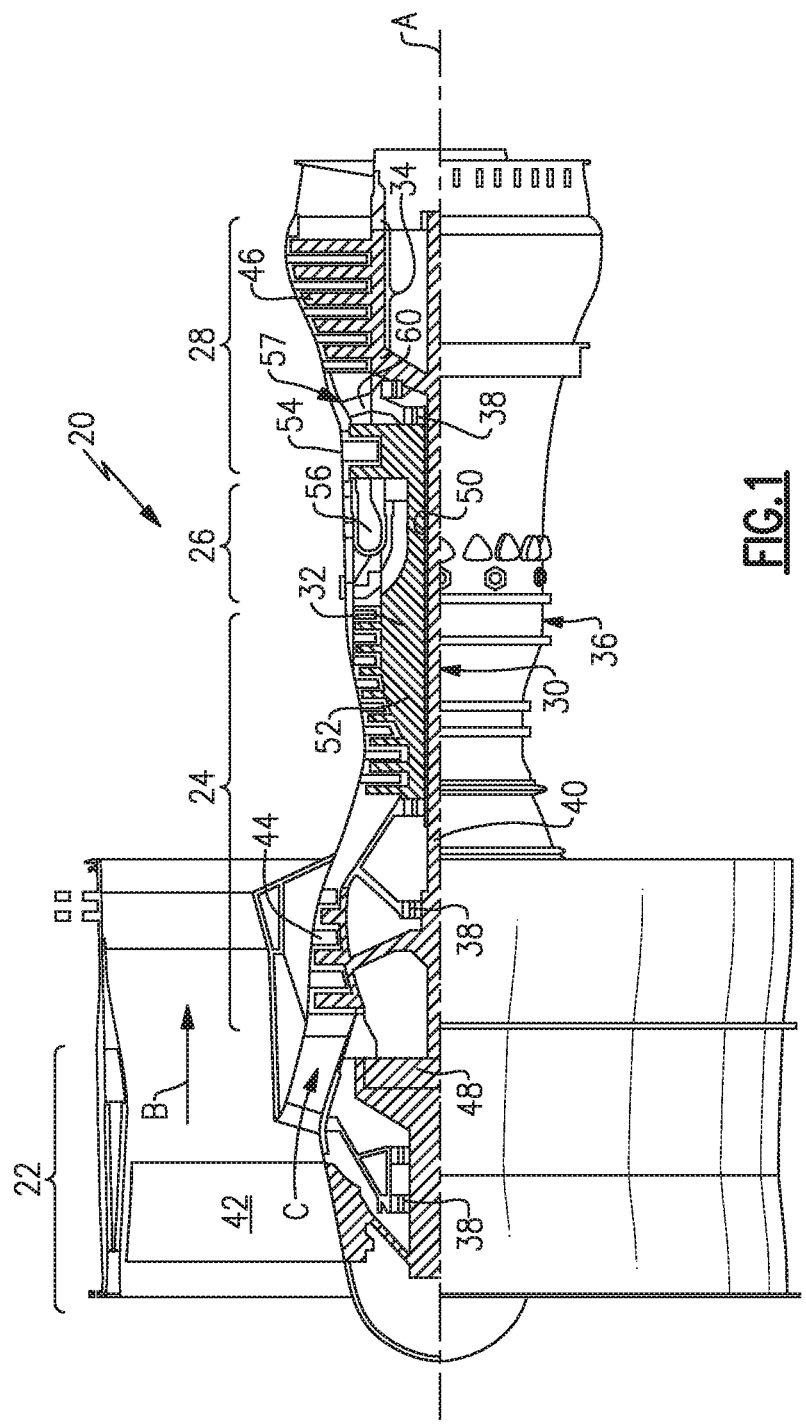
FIG. 1 is a schematic view of an example gas turbine engine.

FIG. 1 schematically illustrates an example gas turbine engine 20 that includes a fan section 22, a compressor section 24, a combustor section 26 and a turbine section 28.

Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about 6 turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
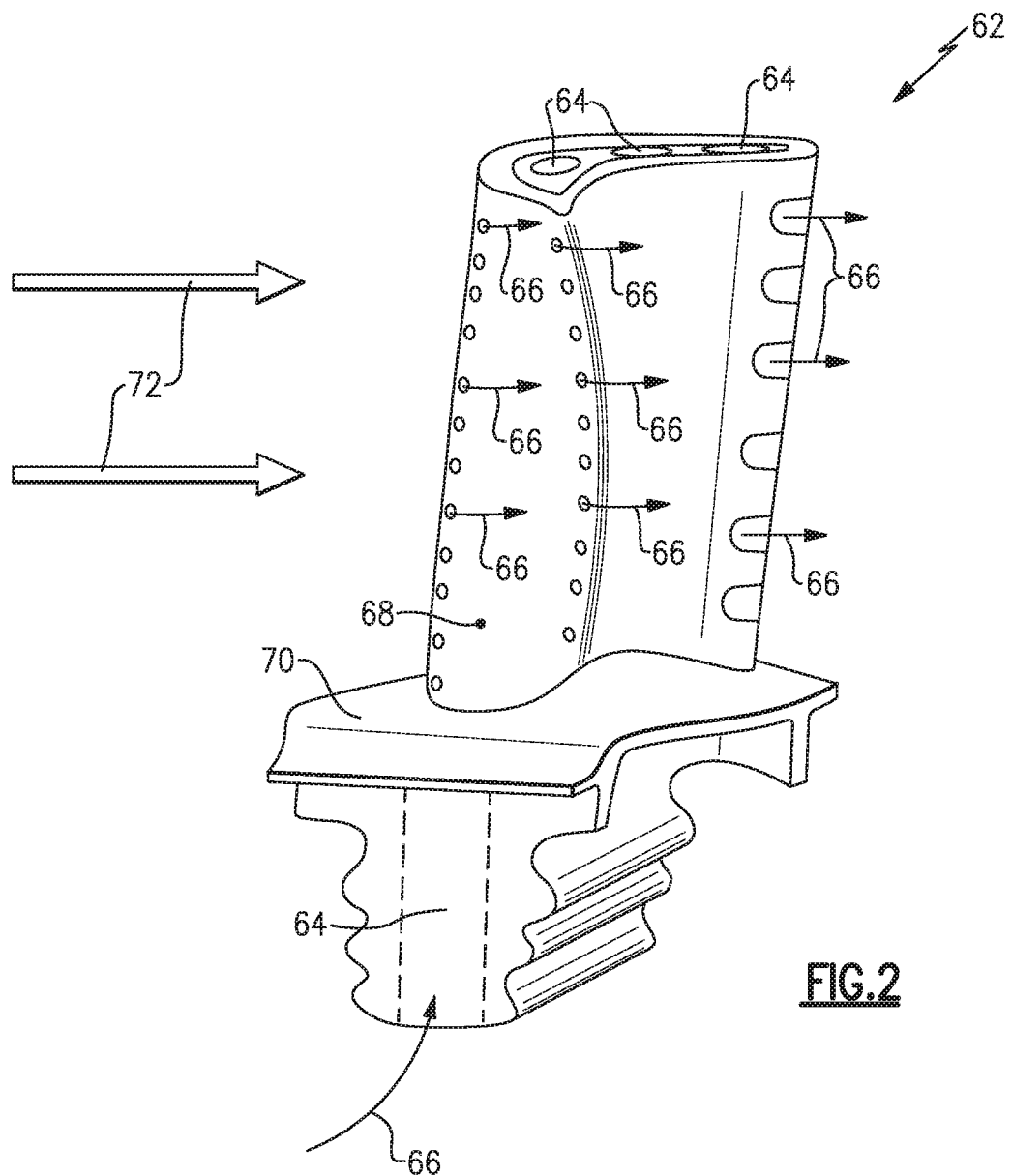
FIG. 2 is a perspective view of an example turbine blade.

Referring to FIG. 2, a turbine blade 62 includes an airfoil 68 extending upward from a platform 70. The airfoil 68 is exposed to high temperature exhaust gas flow 72 and therefore includes cooling air passages 64 for cooling airflow 66. The cooling airflow 66 is circulated within the passages 64 within the airfoil 68 to transfer heat from the turbine blade 62 into the cooling airflow 66. Cooling airflow 66 is then exhausted through openings in the airfoil 68 into the gas flow 72. It should be appreciated that although a turbine blade 62 is disclosed by way of example, other cooled turbine engine components such as turbine vanes, compressor blades and vanes, blade outer air seals and any other component that includes cooling air passages will benefit from this disclosure.

Referring to FIG. 3 with continued reference to FIG. 2, the airfoil 68 includes an internal cavity 74 that defines the cooling air passages 64 and includes a surface 76 with a plurality of chevrons 78. The chevrons 78 induce turbulence into the cooling airflow 66 that improves heat transfer. Each of the cooling air passages 64 includes a different pattern of chevrons 78 to accommodate different heat transfer requirements. Accordingly, the number and spacing of chevrons 78 within each passage is tailored to heat transfer requirement for that passage.

Referring to FIG. 4 with continued reference to FIG. 3, the chevron 78 includes a tip 80 that faces incoming cooling airflow 66. A first rib 82 and a second rib 84 extend from the tip 80. An angle 86 between the first rib 82 and the second rib 84 is greater than 90 degrees.

Previous chevron structures within a cooling channel are provided with ribs disposed at a right angle, or ninety (90) degrees to provide optimal heat transfer. Heat transfer was then adjusted by varying spacing between the ninety (90) degree chevrons. However, some heat transfer requirements are not fully compatible with the ninety (90) degree chevron.

The example chevron 78 includes the angle 86 that is obtuse, or greater than ninety (90) degrees. Moreover, the angle 86 is less than one-hundred-eighty (180) degrees to maintain the relative angular orientation to cooling airflow 66. In another example, the chevron 78 includes the angle 86 that is between about ninety-five (95) degrees and about one-hundred-seventy-five (175) degrees.

Referring to FIG. 5, the disclosed chevron 78 may also include ribs of different lengths. The chevron 78 shown in FIG. 5 includes a first rib 82 that is first length 98 that is different than a second length 96 of the second rib 84. The second length 96 is greater than the first length 98. As appreciated, either the first rib 82 or the second rib 84 could be longer than the other to adapt to specific space and heat transfer requirements.

Referring to FIG. 6, the chevron 78 includes a first height 92 at the first end 88 and a second height 94 at the second end 90. The first height 92 is greater than the second height 94 such that the overall height tapers downward from the first end 88 to the second end 90. As appreciated, the height could taper from the second end 90 to the first end 88 to provide a desired heat transfer capability.

Referring to FIG. 7a, the chevron 78 is illustrated in a side view within the cooling air passage 64. The height 92 is uniform across the entire chevron 78 from the tip 80 to the first and second ends 88, 90.

Referring to FIG. 7b, the chevron 78 is shown with the first height 92 at the tip 80. The first and second ends 88, 90 are provided at the smaller second height 94 such that the chevron 78 is provided with a tapered surface from the tip 80 to the ends 88, 90.

Referring to FIG. 7c, the chevron 78 is illustrated with the tip 80 disposed at the reduced second height 94 with the height increasing toward the first and second ends 88, 90 to the first height. 92. The variation in height provides for tailoring heat transfer properties of the chevron to accommodate local thermal characteristics.

Figure 8:
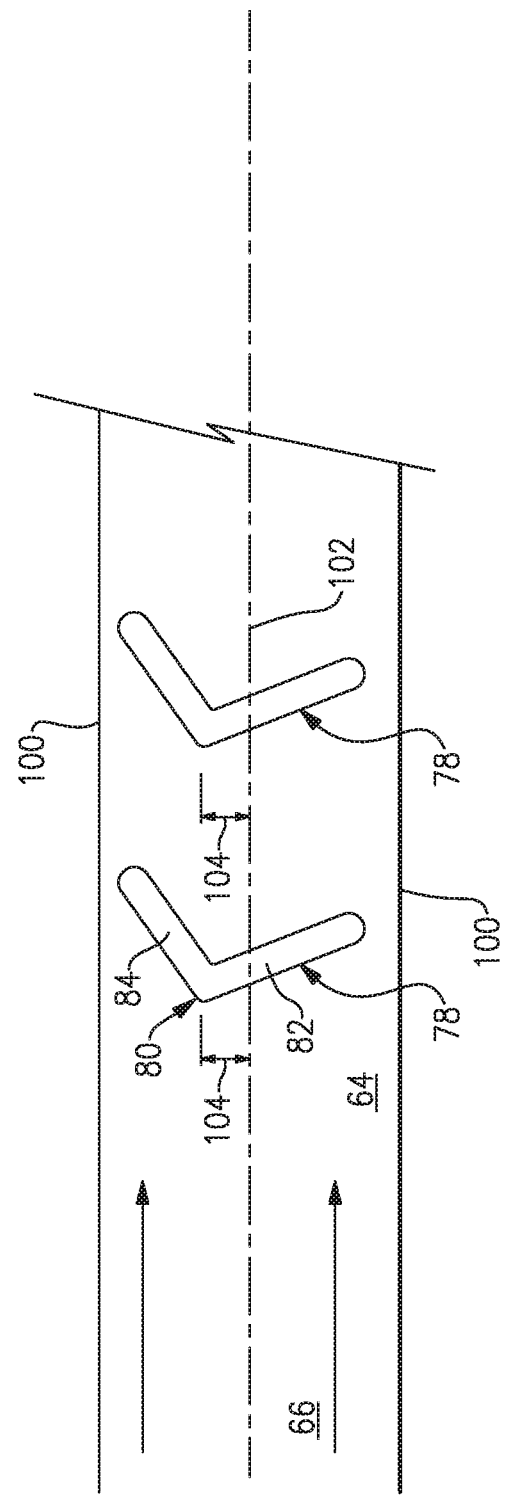
FIG. 8 is a schematic view of a chevron located within a cooling air passage.

Referring to FIG. 8, the chevron 78 is illustrated within the cooling air passage 64 between outer walls 100. A midpoint 102 between the walls 100 is the usual location about which the chevron 78 is centered to be disposed symmetrically within the passage 64. The example chevron 78 is mounted in a non-symmetrical location within the cooling air passage 64. The tip 80 is spaced apart a distance 104 from the midpoint 102 such that it is biased toward one of the walls 100. The non-symmetric orientation of the chevron 78 generates a non-uniform heat transfer characteristic within the passage 64 that provides for tailoring heat transfer properties.

Accordingly, the example chevron 78 provides an obtuse angle between outward extending first and second ribs 82, 84 to enable tailoring of heat transfer within a cooling air passage 64. Moreover, disclosed chevron 78 includes non-symmetrical placement and features such as height and length of each of the first and second ribs 82, 84 to further vary and tailor heat transfer properties to local portions of the airfoil 68 or other cooled turbine engine component.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An airfoil comprising:
   a pressure side wall and a suction side wall;
   a cooling air passage defined between side walls disposed on an interior surface of at least one of the pressure side wall or the suction side wall, the cooling air passage receiving a cooling air flow, the sidewalls of the interior surface having a length; and
   a plurality of chevrons disposed along the side walls of the interior surface, each chevron of the plurality of chevrons including a first rib and a second rib extending from a common tip, the cooling air flow flowing in a direction defined by the cooling air passage so as to have a flowing engagement with the plurality of chevrons,
   wherein the common tip for each chevron of the plurality of chevrons is of a common height and points in a direction facing a direction of the cooling airflow such that the flowing engagement includes at least a portion of the cooling air flow engaging with and flowing over the common tip of each chevron of the plurality of chevrons, and
   wherein an angle between the first rib and the second rib of each chevron of the plurality of chevrons is greater than ninety (90) degrees and the common tip of each chevron of the plurality of chevrons is spaced apart from a midpoint between the side walls.

2. The airfoil as recited in claim 1, wherein the angle between the first rib and the second rib is less than one-hundred-eighty (180) degrees.

3. The airfoil as recited in claim 1, wherein the angle between the first rib and the second rib is between about ninety-five (95) degrees and one-hundred-seventy-five (175) degrees.

4. The airfoil as recited in claim 1, wherein the first rib and second rib include a uniform height above a surface defining the cooling channel.

5. The airfoil as recited in claim 1, wherein the first rib and the second rib include an increasing height from the common tip towards a first end of the first rib and a second end of the second rib.

6. The airfoil as recited in claim 1, wherein the first rib includes a first end and the second rib includes a second end and a height of the chevron increases from the first end toward the second end.

7. The airfoil as recited in claim 1, wherein the first rib includes a first end and the second rib includes a second end and a height of the chevron decreases from the first end toward the second end.

8. The airfoil as recited in claim 1, wherein the first rib and the second rib are of a common length.

9. The airfoil as recited in claim 1, wherein the first rib and the second rib are of unequal lengths.

10. A method of forming a cooling passage comprising:
forming a cooling air passage defined by two side walls and a surface between the two side walls to direct cooling air; and
forming a plurality of chevrons on the surface between the two side walls to include a first rib and a second rib extending from a common tip with an angle between the first rib and the second rib that is greater than 90 degrees, wherein the common tip is spaced apart from a midpoint between the two side walls and points in a direction facing a direction of the cooling airflow such that the flowing engagement includes at least a portion of the cooling air flow engaging with and flowing over the common tip and ends of the first rib and the second rib are spaced apart from a corresponding one of the two sidewalls.

11. The method as recited in claim 10, including forming the angle between the first rib and the second rib to be less than one-hundred-eighty (180) degrees.

12. The method as recited in claim 10, including forming the angle between the first rib and the second rib to be between about ninety-five (95) degrees and about one-hundred-seventy-five (175) degrees.

* * * * *